United States Patent [19]
Sproull

[11] Patent Number: 6,038,646
[45] Date of Patent: Mar. 14, 2000

[54] METHOD AND APPARATUS FOR ENFORCING ORDERED EXECUTION OF READS AND WRITES ACROSS A MEMORY INTERFACE

[75] Inventor: Robert F. Sproull, Newton, Mass.

[73] Assignee: Sun Microsystems, Inc., Palo Alto, Calif.

[21] Appl. No.: 09/012,882

[22] Filed: Jan. 23, 1998

[51] Int. Cl.$^7$ .................................................. G06F 12/00
[52] U.S. Cl. .......................................... 711/158; 711/154
[58] Field of Search ..................................... 711/154, 158

[56] References Cited

U.S. PATENT DOCUMENTS

| | | | |
|---|---|---|---|
| 5,388,262 | 2/1995 | Hillis | 712/204 |
| 5,666,494 | 9/1997 | Mote, Jr. | 711/158 X |
| 5,761,721 | 6/1998 | Baldus et al. | 711/154 X |

OTHER PUBLICATIONS

Weaver, D.L., Germond, T.; "*The SPARC Architecture Manual (Version 9),*" PTR Prentice Hall, © 1994 SPARC International, Inc., ISBN 0–13–099227–5, pp. 117–130, 183–184, 255–266.

Gharachorloo et al.; "Two Techniques to Enhance the Performance of Memory Consistency Models," 1991 *International Conference on Parallel Processing*, pp. I–355—I–364.

Gharachorloo et al.; "Hiding Memory Latency using Dynamic Scheduling in Shared–Memory Multiprocessors," *ACM Sigarch Computer Architecture News*, vol. 20, No. 2, May 1992, pp. 22–33.

Adve et al. "Weak Ordering—A New Definition," *ACM Sigarch Computer Architecture News*, vol. 18, No. 2, Jun. 1990, pp. 2–14.

Scheurich et al. "Correct Memory Operation of Cache–Based Multiprocessors" *ACM Sigarch Computer Architecture News*, vol. 15, No. 2, Jun. 1987, pp. 234–243.

Gharachorloo et al. Memory Consistency and Event Ordering in Scalable Shared–Memory Multiprocessors *ACM Sigarch Computer Architecture News*, vol. 18, No. 2, Jun. 1990, pp. 15–26.

Lenoski et al. The Directory–Based Cache Coherence Protocol for the DASH Multiprocessor *ACM Sigarch Computer Architecture New*, vol. 18, No. 2, Jun. 1990, pp. 148–159.

Fenwick et al. The AlphaServier 8000 Series: High–end Server Platform Development *Digital Technical Journal*, vol. 7, No. 1 1995 pp. 43–65.

*Primary Examiner*—David L. Robertson
*Attorney, Agent, or Firm*—Philip H. Albert; Townsend and Townsend and Crew LLP

[57] ABSTRACT

A memory interface is provided between a processor and a memory subsystem which is capable of multiple concurrent transactions or accesses. The interface between the processor and the memory carries read and write operations as well as "barrier" operations, where a barrier operation signals the non-reorderability of operations. In one variation, the memory interface is an interface to one or more memory mapped input/output (I/O) devices or computational devices.

8 Claims, 5 Drawing Sheets

|     | (a) | (b) |
| --- | --- | --- |
| (1) | RD 3080 | RD 3080 |
| (2) | RD 3100 | RD 3100 |
| (3) | WR 3108, xx | WR 3108, xx |
| (4) | RD 309F | RD 309F |
| (5) | MEMBAR | MEMBAR 309F |
| (6) | WR 309F, xx | WR 309F, xx |
| (7) | RD 3101 | RD 3101 |
| (8) | RD 3102 | RD 3102 |
| (9) | WR 3105, xx | WR 3105, xx |
| (10) | RD 3103 | RD 3103 |
| (11) | MEMBAR | MEMBAR 3105 |
| (12) | RD 3105 | RD 3105 |
| (13) | WR 3108, xx | WR 3108, xx |
| (14) | RD 3103 | RD 3103 |

FIG. 3

|     | READ PATH | WRITE PATH |
|-----|-----------|------------|
| (1) | RD 3080   |            |
| (2) | RD 3100   |            |
| (3) |           | WR 3108, xx |
| (4) | RD 309F   |            |
| (5) | HB 309F   | HB 309F    |
| (6) |           | WR 309F, xx |
| (7) | RD 3101   |            |
| (8) | RD 3102   |            |
| (9) |           | WR 3105, xx |
| (10) | RD 3103  |            |
| (11) | HB 3105  | HB 3105    |
| (12) | RD 3105  |            |
| (13) |          | WR 3108, xx |
| (14) | RD 3103  |            |

FIG. 4

METHOD AND APPARATUS FOR ENFORCING ORDERED EXECUTION OF READS AND WRITES ACROSS A MEMORY INTERFACE

BACKGROUND OF THE INVENTION

The present invention relates to read/write interfaces between processors and memories. More generally, it relates to interfaces between clients of a memory mapped resource and that resource. In a particular embodiment, the invention provides a solution to the problem of efficiently using the interface while still ensuring that reads and writes are performed in proper sequence when a particular sequence is required.

In order to clearly explain the problems and solutions of memory interfaces, several definitions are here provided:

"Memory" refers to a memory system, which may include data paths, controller chips, buffers, queues, and memory chips. While this disclosure describes the problems and solutions in data storage memory, it should be understood that the problems and solutions can be generalized in many cases for memory-mapped circuits which perform more than just storage of data (e.g,, memory-mapped I/O, memory-mapped compute devices).

A "memory location" (or simply "a location") is an individually addressable unit of the memory that can be addressed and that holds data (or transports the data to and/or from an I/O device or a compute device).

A "client" is a central processing unit (CPU), processor, I/O controller or other device which uses the services provided by the memory system. In many instances herein, a statement refers to a processor by way of example; it should be understood that the processor is only one example of a client and the statement is equally applicable to other, nonprocessor clients.

A "request" is an action performed by a client in using the services of a memory system.

A "read request" (or simply "a read") is a request from a client to the memory requesting the contents of a memory location specified by an address of the memory location to be read; the read request is accompanied by the address of the read memory location.

A "write request" (or simply "a write") is a request from a client to the memory requesting that the memory place a write value into a write memory location; the write request is accompanied by the write value and the address of the write memory location.

An "acknowledgment" (or simply "an ack") is an indication returned by the memory to the client indicating that a request has been satisfied; an acknowledgment to a read request includes the data read from the specified memory location.

"Pending reads" is the set of read requests which are pending; a read request is "pending" from the time it is accepted by the memory until the memory issues an ack.

"Pending writes," analogous to pending reads, is the set of write requests which are pending; a write request is "pending" from the time it is accepted by the memory until the memory issues an acknowledgment.

When building memory systems for large computers, one feature which provides for high performance is concurrency, wherein more than one memory operation is in progress at the same time. One limitation on concurrency is that a CPU, or other client, requires memory consistency. A memory appears consistent when a "read" of a memory location returns a value most recently "written" in that location. In some systems with concurrency, reads and writes are reordered into an optimized execution order to achieve higher performance, however this may lead to loss of consistency. For example, if a write to location A changes the value there from "X" to "Y", and a read follows the write, the result of the read is the value "Y". However, if the read and write are reordered in an optimization step, the read will return the erroneous value "X". Therefore, any optimization process must ensure that the reads and writes are performed such that the read returns the correct value.

Memory consistency is essential, as the purpose of a memory is to retain a data value associated with each memory location. A read request addressed to a particular location (address) will return the current value held in that location. A write request addressed to that location will change the current value (unless, by coincidence, the old value and new value are the same). Consistency is easy to implement if memory requests are always processed in exactly the same order as they are issued by the client. Preserving the order exactly, however, is often not possible in high-performance memory designs which may need to reorder requests to speed up processing. For example, the system requirements might be such that read requests must be completed faster than writer requests because pending read requests hold up processing until the read data is returned.

However reordering of requests is done, it must not violate the consistency that is inherent in the one-request-at-a-time memory model described above. One set of reordering constraints are as follows:

Rule 1: A read of location X followed by a write of location X cannot be reordered among themselves.

Rule 2: A write of location X followed by a read of location X cannot be reordered among themselves.

Rule 3: A write of location X followed by another write of location X cannot be reordered among themselves.

Where one of the above rules hinders performance of the system, schemes have been proposed to modify requests in some cases to maintain consistency. For example:

Rule A. If a write (W1) of location X is followed by a read (R2) of that same location X, read R2 can be acknowledged immediately, with the acknowledgment reporting the data value which was to be written as part of write W1.

Rule B. If a write (W1) of location X is followed by a write (W2) of that same location X, write W1 can be acknowledged immediately, without actually doing a write. Write W2 is allowed to proceed normally.

Rule A is often implemented by adding "store buffers" to the processor. Rule B is almost never implemented because its performance advantage is very slight. Nonetheless, Rules A and B give some insight into what can be done at the processor to increase concurrency and thus improve performance while still maintaining consistency.

A simple approach to improve performance is to defer write requests in order to satisfy a read request, so that the client can proceed with its computation using the read result sooner than if it had to wait until after the write request was complete. However, if the deferred write would have changed the result of the read, consistency is violated. Various schemes have been devised for maintaining consistency in cases such as this.

One such scheme for enforcing ordering requirements is described in Section 8.4.3 of the SUN SPARC-V9 manual. That manual was published by the Assignee of the present invention and is incorporated herein for all purposes. Section 8.4.3, beginning on page 124, describes the "MEM-BAR" instruction. An MEMBAR instruction provides a way for a programmer to enforce an order of reads and writes issued by client. MEMBAR instructions are interspersed in instructions codes executed by a processor. When a processor is executing instructions and encounters a MEMBAR instruction, it holds up further read and write operations until the operations which preceded the MEMBAR instructions have completed.

U.S. Pat. No. 5,748,539 (Patent application No. 08/811,909 filed Mar. 5, 1997 and entitled "Recursive Multi-Channel Interface", hereinafter "Sproull-Sutherland") discloses a method of determining whether the read and write operations have been completed (that patent/application is commonly assigned to the assignee of the present application and is incorporated herein by reference for all purposes).

Referring again to the SUN SPARC-V9 manual, that reference explains how the ordering constraints are enforced by the processor. There, given a first operation and a second operation, if the second operation must not be performed before the first operation, the execution unit delays the submission of the second operation to the memory until the first operation is no longer pending. This is disadvantageous in systems where the processor-memory interface is bandwidth limiting, as the deferral of submission of the second operation by the processor to the memory may result in lower performance if the bandwidth of the interface is left idle when the processor could have used the idle time to send the request for the second operation.

If the memory system is designed in such a way that read requests and write requests are processed by separate paths, consistency checks cannot be easily performed and the client maintains consistency by allowing only a single pending request at once. To achieve more performance in the dual-path memory system, several requests must be pending at once. The consistency constraint must be relaxed to require only that a new request a client is about to send cannot violate consistency if reordered with respect to any pending request. This check can be accomplished if the client retains a record of pending reads and pending writes and checks each new request against the pending requests before the new request is issued. If the client has a "store buffer" as mentioned above, the store buffer may do some of this checking.

The client maintains its record of pending reads and writes by noting (a) when it issues each new request and (b) when each request is eventually acknowledged, signifying that the request is no longer pending. However, where the processor holds up an operation instead of using a bandwidth-limited interface whenever the interface is available, performance may be lost as extra time would be needed to send the held-up request and the critical path involving that request would be lengthened.

Much has been written on memory consistency and memory coherence models which use memory barrier, or "fence", instructions, but those are generally used in the context of multiprocessor systems where the goal is to properly order instructions among multiple processors, without fully addressing whether or not each individual processor sees a consistent order.

Memory consistency and memory coherence models generally exist in the context of a multiprocessor systems, and therefore address how operations of separate processors are ordered among themselves rather than how an individual processor is assured a consistent order. Nonetheless, it is known how to address memory consistency in the context of single processors. For example, the following references describe commercial microprocessors and their corresponding multiprocessing systems using some of these techniques:

(1) K. Gharachorloo et al., "Two Techniques to Enhance the Performance of Memory Consistency Models," Proceedings of the 1991 Intern. Conf. on Parallel Processing, I:355–364, August, 1991;

(2) S. Adve et al., "Weak Ordering—a New Definition," Proc. 17th Intern. Symp. on Comp. Arch., June 1990, pp. 2–14;

(3) K. Gharachorloo et al., "Hiding Memory Latency using Dynamic Scheduling in Shared-Memory Multiprocessors," Proc. 19th Intern. Symp. on Comp. Arch., May 1992, pp. 22–33 (surveying the field in its "Background" section);

(4) C. Scheurich et al., "Correct Memory Operation of Cache-Based Multiprocessors," Proc. 14th Intern. Symp. on Comp. Arch., June 1987, pp. 234–243;

(5) K. Gharachorloo et al., "Memory Consistency and Event Ordering in Scalable Shared-Memory Multiprocessors," Proc. 17th Intern. Symp. on Comp. Arch., June 1990, pp. 15–26;

(6) D. Lenoski et al., "The Directory-Based Cache Coherence Protocol for the DASH Multiprocessor," Proc. 17th Intern. Symp. on Comp. Arch., June 1990, pp. 148–159; and (7) D. Fenwick et al., "The AlphaServer 8000 Series: High-end Server Platform Development," Digital Technical Journal, vol. 7, no. 1, August 1995 (hereinafter "Fenwick"), each of which is incorporated herein for all purposes. Fenwick appears to show how barrier instructions operate in the context of the Alpha 21164 microprocessor, built by Digital Equipment Corporation. There, a barrier instruction, MB or "memory barrier", is provided. The MB instruction is reported off-chip, and may be used at the interface between the microprocessor and the memory bus, but the MB instructions do not apparently pass over the memory bus. As Fenwick indicates, since the memory system processes requests in the order they are issued by the processor, the MB information is not needed beyond the bus. A similar instruction is used in the memory interface of most microprocessors (for example, waiting for all pending memory transactions to complete before allowing any new memory requests to be issued), but the interface circuitry is commonly provided on the microprocessor chip itself.

Therefore, what is needed is a processor-memory interface which allows the processor to enforce execution order of concurrently submitted operations, even when multiple operations required to be ordered are submitted to the memory which may reorder operations for its own purposes.

SUMMARY OF THE INVENTION

In one embodiment of the present invention, a memory interface is provided between a processor and a memory which is capable of multiple concurrent transactions or accesses. The interface between the processor and the memory carries read and write operations as well as "barrier" operations, where a barrier operation signals the non-reorderability of operations. The barrier operations are used in connection with resolved regions and unresolved regions of a processor system's architecture. The unresolved region is a region wherein operations may be reordered for efficiency or other reasons and the resolved region is a region wherein the operations are in a fixed order from which they cannot be reordered. By sending the barrier operations through the unresolved region, reordering constraints can survive the travel through the unresolved region so that any necessary reordering between the unresolved region and the resolved region can occur. Since the unresolved region extends into the memory, it is possible for the memory to perform optimization reordering or other reordering of operations. Once the operations reach the boundary between the unresolved region and the resolved region, the operations are reordered, as needed, to comply with the constraints of the barrier operations.

In one variation of the present invention, the memory interface is an interface to one or more memory mapped input/output (I/O) devices or computational devices. In another variation, memory operations are initiated by more than one processor.

While the exact location of the processor-memory boundary might not be clear, the present invention is useful wherever reordering dictated by the memory system is being performed, as opposed to reordering dictated only by the processor.

A further understanding of the nature and advantages of the inventions herein may be realized by reference to the remaining portions of the specification and the attached drawings.

BRIEF DESCRIPTION OF THE DRAWINGS

FIG. 3 shows an example of a request stream as might be used in the present invention.

FIG. 4 shows a variation of the request stream of FIG. 3 as might be used in a dual-path request stream system.

DESCRIPTION OF THE PREFERRED EMBODIMENTS

The following description describes one embodiment of the present invention, wherein a concurrent memory system used with a processor (client) which provides the memory system with sufficient information to allow the memory system to guarantee consistency of memory requests when such a guarantee is necessary even while the memory system reorders requests. The memory system is free to determine how best to reorder requests in order to improve performance, so long as the consistency constraints imposed by the processor are met.

In many processing systems, there are occasions where the performance of the system can be improved by reordering sequences of operations from an order in which the operations are specified to an order in which the operations are handled. However, to avoid unintended effects, a client specifying the sequence must be able to also specify when a portion of the sequence must be handled in the order specified and not reordered. For example, a processor might specify a sequence of memory requests. The memory requests are executed at a memory, after passing through processor logic and buffers, a processor-memory bus (which might be shared with more than one processor and/or more than one memory), and an memory interface circuits interposed between the bus and the memory.

Any of these intermediate elements might be adapted to reorder the sequence of memory requests. For example, if a memory interface circuit includes a paging unit, for loading and unloading pages of memory from a slow, large memory to a fast, core memory where all memory requests happen within the core memory, the memory interface circuit might reorder memory requests so that all the requests to be done within one page of memory are done at once to reduce the number of page swaps required to fulfill all of the memory requests.

If a system does not reorder requests, the order of the requests can be determined at any point in the path of these memory requests from a processor to a memory. However, if a system does reorder requests, there are some points in the path where the order of the memory requests is not necessarily resolved or resolvable. The collection of these points is referred to herein as the "unresolved region" of the path and an "unresolved" pathway is a pathway, such as a network or a bus, which carries requests in an unresolved order. When a processor must be able to specify a particular order of handling, at some point the unresolved region must end. Beyond that point is referred to herein as the "resolved region" of the path. In the resolved region, operations (memory requests in the present example), however, are in a fixed order from which they will not be further reordered.

Figure 1:
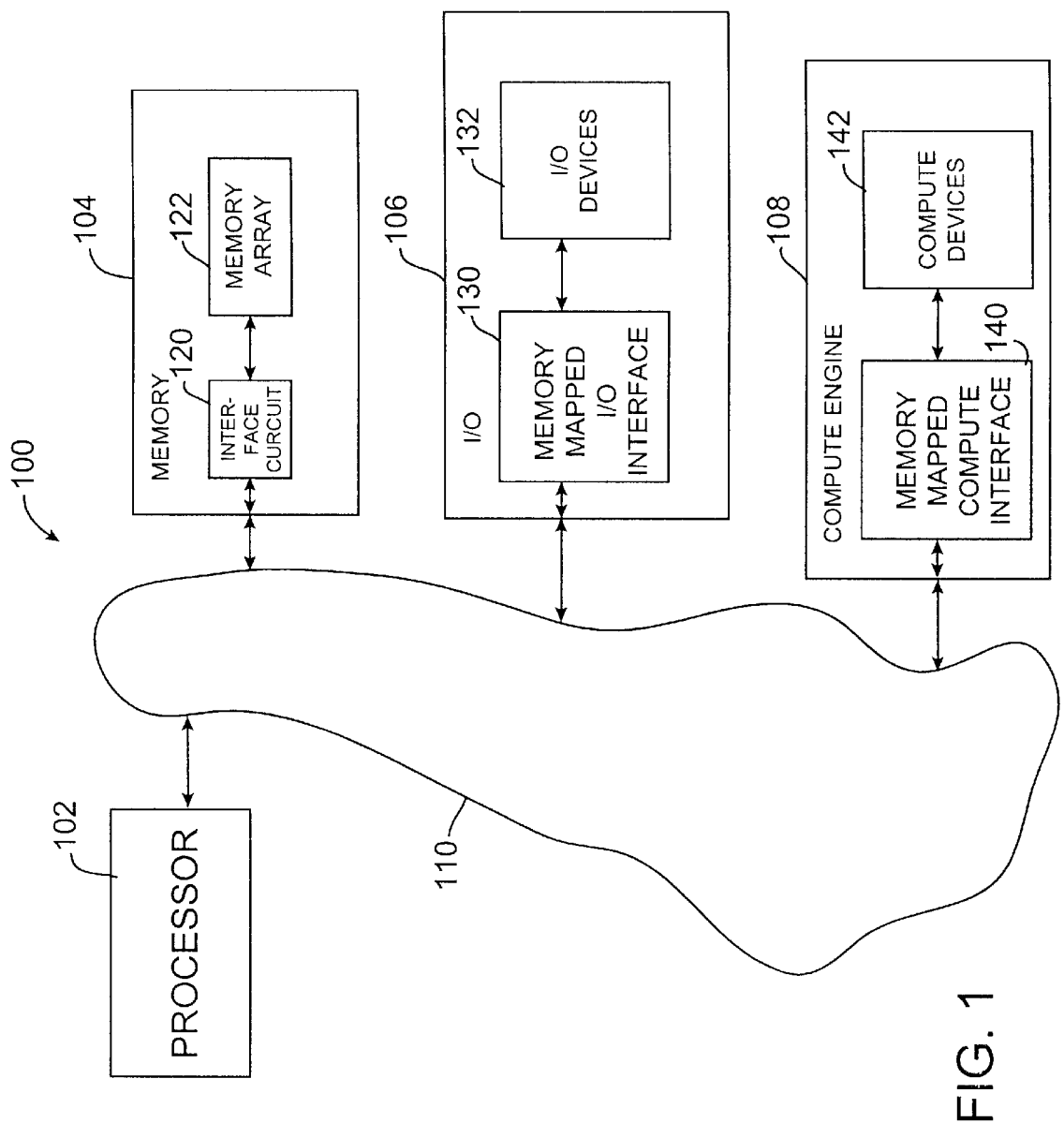
FIG. 1 is a block diagram of a processing system according to the present invention.
Figure 2:
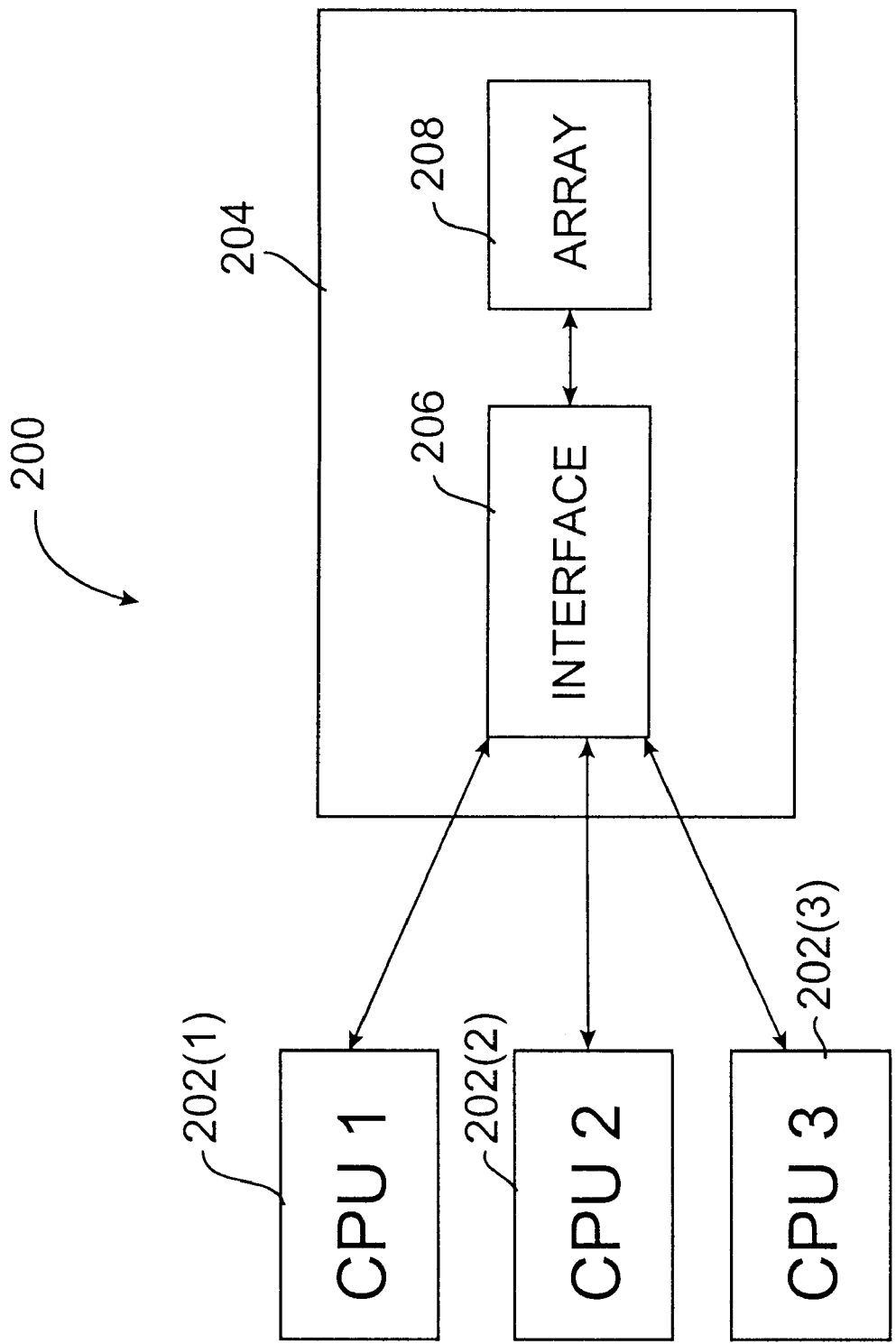
FIG. 2 is a block diagram of a multiple processor processing system according to the present invention.

Referring now to FIGS. 1–2, processor systems in which an order enforcing system according to the present invention might be used as there shown.

FIG. 1 shows a processor system 100 comprising a processor 102, a memory subsystem 104, an I/O subsystem 106 and a compute subsystem 108. Each of these components is coupled via a communications link 110. Each of the three subsystems is memory-mapped, i.e., processor 102 interfaces with the subsystem using addressed read and write requests as if the subsystem were an addressable memory. Communications link 110 could be a memory bus, a network, or the like.

Memory subsystem 104 is shown comprising a memory interface circuit 120 and a memory array 122. When processor 102 sends a read request or a write request over communications link 110 to memory subsystem 104, it is received and handled by memory interface circuit 120 and interface circuit 120 handles the storage and retrieval of data in the specified locations of memory array 122. Of course, depending on the nature of communications link 110, requests might be reordered within communications link 110.

I/O subsystem 106 is shown comprising a memory-mapped I/O interface circuit 130 and the I/O devices are shown generally as 132. Interface circuit 130 receives and handles requests from processor 102 in much the same way as interface circuit 120 handles memory requests. Memory-mapped I/O is not the focus of this description and is well known, so many details are omitted here for brevity.

Compute subsystem 108 is shown comprising a memory-mapped compute interface circuit 140 and a compute device 142. As with the other interface circuits, interface circuit 140 receives and handles requests from processor 102 over communications link 110. Interface circuit 140 converts requests, which are formatted as requests to a particular memory location, into messages to and from compute device 142 according to a predetermined memory map and convention. For example, computer device 142 might be a floating point processor and, by convention, a read request from a particular memory address might be a request for the results of a floating point operation, while a write request to a particular memory address might be an operand used in a floating point operation.

The reordering enforcement system according to the present invention is not limited to bus-based systems. It can also be used in a client-memory computing architecture where the client or clients are coupled to memory by point-to-point connections or by a network, which sends requests as messages according to the particular network's protocol. Note that the protocol may allow the network to reorder messages, thereby reordering requests.

The particular details of I/O subsystem 106 and compute subsystem 108 are not as important as the understanding that ordering of requests can be important in these subsystems. For example, if processor 102 sends a write request to I/O subsystem 106 to configure an external I/O device (such as initializing a serial communications circuit) then processor 102 sends a read request to gather data from that I/O device, those requests should appear at the I/O device in the order required by processor 102. Likewise, if processor 102 sends a write request to compute subsystem 108 containing operands of an operation followed by a read request to obtain the results of the operation, interface circuit 140 or communications link 110 should return those requests to an order relative to each other that is the order in which processor 102 sent the requests, if either of those devices reordered the requests for its own internal efficiency.

In the prior art, processor 102 might hold off on sending a request to avoid having it reordered with respect to a pending request, however in the present invention, processor 102 can send the requests over communications link 110 with the confidence that the communications link and the interface circuit which receive the request will not reorder the request relative to pending requests when processor 102 prohibits such relative reordering of if they do, they will return them to the proper order. This permits processor 102 to send requests as soon as they are ready to be sent, which avoids a number of inefficiencies, such as requiring that processor 102 maintain a queue of held up requests and letting communications link 110 be idle when it could be used for sending requests.

FIG. 2 shows an alternate arrangement of processors and subsystems which also benefits from the order enforcement to be described. In FIG. 2, a multi-processor system 200 is shown with three processors 202(1)–(3) coupled to a memory subsystem 204. It should be understood that processors 202 could be connected to memory subsystem 204 via a bus and that memory subsystem 204 could be replaced with another subsystem, such as one shown in FIG. 1, without departing from the scope of this disclosure.

Memory subsystem 204 is shown comprising interface circuit 206 and memory array 208. As multiple processors 202 are accessing memory array 208 via interface circuit 206, interface circuit 206 coordinates requests from the multiple processors 202.

Order enforcement according to the present invention is described below, with reference to FIGS. 3–4 and other figures as needed. Order enforcement is first described with reference to a memory system with a common read-write path, followed by a memory system with independent read and write paths. Sproull-Sutherland discloses such an independent path memory system and describes its advantages. Those descriptions are then followed by a description of order enforcement in a "banked" memory system.

FIG. 3(*a*) shows an example of a request stream as might be issued by a processor to a memory subsystem or other memory-mapped subsystem. The request stream shows read requests, write requests and barrier requests. A barrier is sent to the memory subsystem to signal that the subsystem should not reorder requests across the barrier, i.e., that all requests received prior to the barrier must be handled before any request received after the barrier. The barrier requests are indicated by the label "MEMIBAR" which is short for "memory interface barrier." MEMIBAR requests should not be confused with MEMBAR instructions, which are instructions inserted into a program to control the operation of a processor. By contrast, the MEMIBAR requests are sent from the processor to the memory subsystem to enforce ordering.

Referring now to the request stream of FIG. 3(*a*), fourteen requests are shown being sent to a memory subsystem, in order, from request 1 to request 14. In this request stream, read requests include an address and write requests include an address and the data to be written (as the actual data is not relevant here, it is shown in FIG. 3(*a*) as "xx"). As shown, requests 5 and 11 are barriers, and therefore the memory subsystem is free to reorder requests 1–4 among themselves, 6–10 among themselves and 12–14 among themselves. For example, if the memory subsystem is a paged memory and the addresses 30FF and 3100 are on different pages, the memory subsystem might otherwise group requests dealing with one page (requests 1, 4 and 6) to perform them before a page swap and group the remainder of the requests to perform them after the page swap. However, since request 5 is a barrier, request 6 cannot be reordered for execution before the page swap because that would require it to be executed before requests 2–3.

The barrier at request 5 ensures that request 6 (a write to address 309F) does not get reordered relative to request 4 (a read from address 309F). This is necessary to ensure that the correct, pre-write, value is returned for the read request. However, in most cases, it would not be necessary for the memory subsystem to ensure that reads and writes from different memory locations are not reordered relative to each other. For example, the barrier at request 5 prevents request 6 from being reordered relative to requests 2 and 3. The barrier at request 11 also prevents request 10 from being reordered relative to requests 12 and 13. If these constraints are not necessary, the order enforcement subsystem would be overly restrictive.

FIG. 3(*b*) shows an example of an alternate form of a request stream, wherein the over-restrictiveness can be avoided. In that form, the barrier requests include an address to indicate the requests for which the barrier applies. In the case of request 5 ("MEMIBAR 309F"), that barrier constrains only the relative reordering of requests which deal with address 309F, namely requests 4 and 6. This way, the memory subsystem can reorder requests 4 and 6 relative to requests 2 and 3 for more efficient paging. Also, request 14 can be reordered relative to requests 10–13, thereby allowing two read requests to be handled with a single read, as might occur when two processors are reading the same memory address.

Of course, if the requirement that barrier requests include addresses leads to an excess of barrier requests (e.g., a multitude of consecutive barrier requests, one per address being constrained by a barrier), the former system might be more efficient.

With reference to FIG. 3, the processor need not introduce barrier requests to enforce ordering of requests when one of the requests has already been acknowledged by the memory system. For example, the writes to location 3108 that appear on lines 3 and 13 must be ordered, but this example assumes that by the time the request on line 13 is issued, the request on line 3 has been acknowledged.

In the Sproull-Sutherland dual-path memory, a more complex barrier procedure is needed. Generally, in the embodiment to be described, the client (a processor, in this example) sends a "half barrier" ("HB") into the read request path and sends another HB into the write request path whenever the client determines that writes and reads cannot be reordered. The client retains a record of pending reads and pending writes, and checks a new request before sending it to the memory. If there is a possible conflict, the client first sends the HB markers and then issues the new request. The memory system obeys the following rules:

Rule M1: An HB marker in the read path must never be reordered with respect to a read request.

Rule M2: An HB marker in the write path must never be reordered with respect to a write request.

Rule M3: When both the read path and the write path share access to one or more memory locations, the paths must be synchronized by HB markers.

Rule M3 requires that the paths be synchronized by HB markers. One way to do this is, when one path (read or write) processes an HB marker, the memory must hold that path up until the other path (write or read, respectively) reaches an HB marker. Intermediate elements which handle requests, but which are elements that need not serialize memory accesses, need not hold up for HB markers. Thus, Rule M3 should be applied only to elements which must serialize requests, such as the read/write interface at a memory chip.

As the read requests, write requests and HB markers travel through the memory system, they eventually come to a "memory chip" itself. Prior to the memory chip, reads and writes may be traveling in separate paths, much like a two-ported memory (i.e., having separate read and write ports). These ports may be designed with a "recursive interface" as described by Sproull-Sutherland. Inside this memory chip, the read and write paths finally meet, both potentially accessing the same memory location. To avoid consistency problems, Rule M3 is enforced there.

Another way of thinking about this operation is that a pair of HB markers is inserted into the memory system by the client and those markers meet together at the memory chip, where they are used to synchronize the read and write channels. Subject only to the three rules (M1, M2, M3), the memory system may then apply arbitrary policies to requests, give priority to reads, reorder writes with respect to each other (e.g., to take advantage of fast "page mode" on memory chips), etc.

The dual-path request streams, similar to those shown in FIG. 3, are shown in FIG. 4. FIG. 4 shows the half barriers with addresses, as is the case in FIG. 3(b), but the dual-path memory system could also be implemented without half barrier addresses, as is the case in FIG. 3(a).

As with the barrier requests shown in FIG. 3(a), the HB markers would be more powerful than necessary to establish the required ordering constraints if they did not include addresses. If an HB marker must be inserted before a read of location X or before a write of location X, it is because there is a pending read or write request for location X that might conflict. In such cases, the memory subsystem need only guarantee that pending requests for location X are not reordered with respect to the marker. Therefore, if the address X is attached to the HB marker, potential conflicts can be avoided without excessive restraint.

When addresses are included with HB markers, rules M1 and M2 change to constrain only the ordering of an HB X and a read X/write X. M3 does not need to change, because markers are never reordered with respect to each other, so they always arrive at the memory chips in the same order they were issued.

Above, two examples of full/half barriers are described, one with the barrier without an address and one with an address. In yet other variations, the barriers include something in between an address and no address, i.e., a partial address. With partial addressing, the tag included with a barrier specifies only some subset of the bits of the address. Thus, an HB X marker will identify a set of addresses that might conflict.

The selection of address bits to use in the marker might vary depending on the configuration of the memory system or the characteristics of the client. For example, the subset might be the "low order" bits of the address, or the "high order" bits of the address. Those skilled in the art of memory design will recognize that these are only examples and that other subsets of address bits could be used.

The objective in associating full or partial addresses with a marker is to reduce the frequency with which markers must be introduced into the memory system. The reason is that markers will prevent the memory system from reordering memory requests to achieve maximum performance.

With full or partial address tags, order enforcement can also be used with "banked" memory. Large memories are often composed of memory banks, i.e., each bank is responsible for a range of memory locations. The memory system has some form of "distributor" that accepts memory requests and distributes them to the proper bank, i.e., the bank that contains the memory location specified in the read or write request. One special form of bank structure is known as "interleaving" in which low-order address bits select a memory bank. For example, in a two-bank system, even addresses are located in one bank and odd addresses in another.

The distributor delivers memory requests according to which bank contains the addressed location. It must also deliver markers. Markers without addresses must be delivered to every bank, because the memory system cannot know which requests are being prevented from reordering. Thus, for example, in a two-bank system, when the distributor receives a marker along the read path, it must send a marker to each of the two banks along their respective read paths. However, if a marker contains an address, it is necessary to forward that marker only to the one bank that contains that address. Note that partial address tags can be used with banked memory to the same effect, so long as the tag identifies the bank.

Although FIGS. 3–4 show operations on single memory addresses, it should be understood that the amount of memory processed as part of a particular request is not fixed, but can vary. For example, a memory system might be configured to handle several sizes of requests, such as a single word read, a cache line read (e.g., 16 words in a cache line), single word write, cache line write, or writing selected bytes within a word. In each case, the "address" of the read or write request is the address of the first word of what may be a multi-word request. This may be important in deciding whether a barrier that contains an address (first word address) can be reordered with respect to another request.

Figure 5:
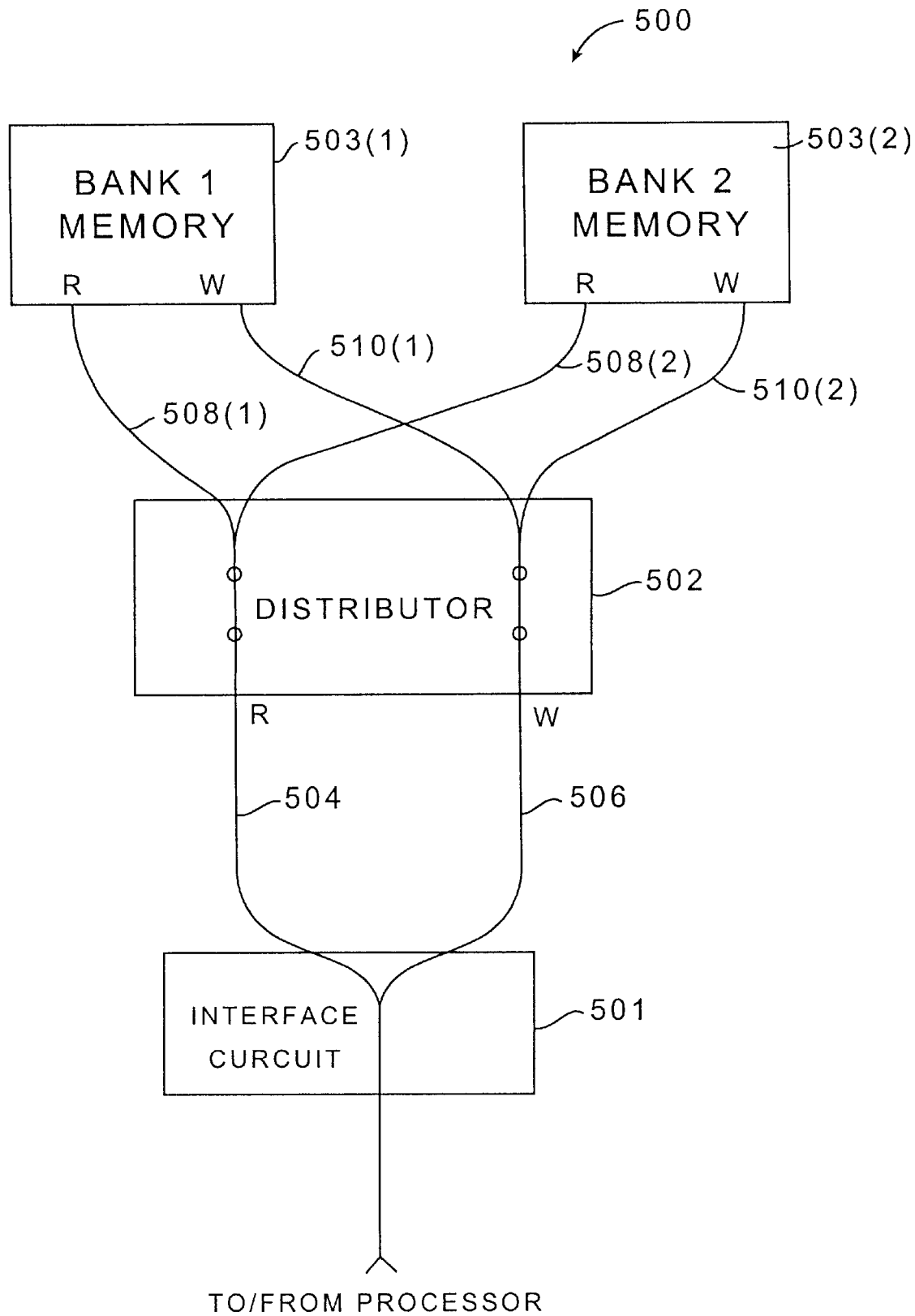
FIG. 5 is a block diagram of a banked memory system according to the present invention.

FIG. 5 is a block diagram of a banked memory subsystem 500 illustrating these points. Banked memory subsystem 500 is shown with an interface circuit 501 coupling subsystem 500 and a processor and a distributor 502 which routes memory requests to the appropriate memory bank. Two bank memories 503 are shown, but it should be understood that the memory can be divided into more than two banks. As shown, read requests and write requests travel along separate paths, namely read path 504 and write path 506. Distributor 502 examines the address of each request and, in this example, routes requests with odd addresses to bank memory 503(1) using a bank read path 508(1) and a bank write path 510(1) and routes requests with even addresses to bank memory 503(2) using a bank read path 508(2) and a bank write path 510(2). Reordering for memory optimization might occur at either interface circuit 501, distributor 502 or at the inputs of bank memories 503.

The flow of barrier requests will now be described. When a processor sends a barrier request to bank memory subsystem 500, interface circuit 501 sends one half barrier along path 504 and one half barrier along path 506. As explained above, this will allow bank memory controller 500 to prevent reordering of read and write requests relative to each other even though they travel along separate paths. When the half barriers are detected by distributor 502, the half barrier from read path 504 is sent along bank read paths 508 and the half barrier from write path 506 is sent along bank write paths 510. Since a half barrier received on one of bank paths 508 or 510 will hold up memory accesses until the matching half barrier arrives, the broadcasting of half barriers to all bank memories 503 might be overly restrictive. To avoid any efficiency loss due to over restrictiveness, the barriers can include addresses as described above, or can include enough of a partial address so that distributor 502 can identify the bank to which the barrier applies. If such addresses or partial addresses are included, distributor 502 can selectively route the half barriers to only the bank memory containing the address for which the barrier applies.

Significantly, distributor 502 does not need to hold up for half barrier markers to synchronize, but will send along half barrier markers and read or write request as received.

In an alternate embodiment, a processor has an interface to a distributed memory having both local memory and "remote" memory, where the remote memory is connected to the processor by a high speed network, a bus extension, or the like. These systems are treated exactly like the multi-bank memory systems, as described above. Half barrier markers will be sent to the remote memories just as they are sent to banks in the example shown in FIG. 5.

Although the systems described above implement marker (half barrier) synchronization at the memory chip interface, other variations are possible. All that is required is that the read and write paths synchronize at some point in their processing, beyond which no reordering is permitted (i.e., there is a nonzero "resolved" region). Such a synchronization point is possible at many different points in a memory system.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. An interface between a memory subsystem and a processor, wherein the memory subsystem is capable of multiple concurrent transactions, the interface comprising:
   means for sending memory requests from the processor to the memory subsystem, the memory requests including read requests and write requests;
   means, within the memory subsystem, for reordering memory requests from an order of receipt from the processor to an alternate order; and
   means, within the memory subsystem, for receiving reordering constraints from the processor and for constraining the means for reordering according to the received reordering constraints.

2. The interface of claim 1, wherein the means for reordering memory requests to an alternate order is a means for reordering memory requests to an alternate order which allows for more efficient processing of reordered requests.

3. An interface between a memory subsystem and a processor, wherein the memory subsystem is capable of multiple concurrent transactions, the interface comprising:
   a memory interface coupling the processor and the memory subsystem, wherein the memory interface carries read requests and write requests from the processor to the memory subsystem and carries request responses and acknowledgments from the memory subsystem to the processor;
   a barrier generator, within the processor, for generating barrier markers indicating reordering constraints;
   an unresolved pathway, within the memory subsystem, within which requests received from the memory interface in a received order are reorderable into an order preferred by the memory subsystem not subject to the reordering constraints, the unresolved pathway also carrying representations of at least some of the reordering constraints; and
   a resolved pathway, within the memory subsystem, within which requests are in a final order, wherein the final order is consistent with the reordering constraints.

4. The interface of claim 3, wherein the unresolved pathway comprises a plurality of pathways, each capable of independently reordering requests.

5. The interface of claim 3, wherein the request interface reorders memory requests to an alternate order which allows for more efficient processing of reordered requests.

6. The interface of claim 3, wherein the request interface reorders memory requests to an alternate order which reorders multiple accesses to individual memory addresses into sequential accesses of the individual memory addresses, thereby allowing multiple requests to be satisfied with single memory accesses.

7. A processor system comprising:
   a processor, which issues memory requests and reordering constraints, wherein a reordering constraint indicates that some memory requests must be fulfilled in a specified order;
   a memory subsystem, coupled over a processor-memory interface to a processor, the memory system having unresolved pathways along which requests are reorderable by the memory subsystem and resolved pathways following the unresolved pathways in which resolved pathways are pathways along which requests flow in a final execution order;
   concurrent transactions, the interface comprising:
   means for sending memory requests from the processor to the memory subsystem, the memory requests including read requests and write requests;
   means, within the memory subsystem, for reordering memory requests from an order of receipt from the processor to an alternate order based on an optimization by the memory subsystem; and
   means, within the memory subsystem, for receiving reordering constraints from the processor and for constraining a final order of memory requests in the resolved region according to the received reordering constraints.

8. The processor system of claim 7, wherein the memory subsystem is a memory subsystem which is capable of responding to multiple, concurrent memory requests.

* * * * *